US012781019B2

(12) United States Patent
Liu et al.

(10) Patent No.: US 12,781,019 B2
(45) Date of Patent: Nov. 3, 2026

(54) METHOD FOR PREPARING GRAPHENE MASTERBATCH BY AQUEOUS PHASE SYNERGISTIC AGGREGATING PRECIPITATING PROCESS AND METHOD FOR MOLDING LONG-LIFESPAN TIRE FOR LOADING WHEEL OF HEAVY-DUTY VEHICLE

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Xiaoyuan Duan, Taiyuan (CN); Shuaishuai Cheng, Taiyuan (CN); Guizhe Zhao, Taiyuan (CN)

(73) Assignees: NORTH UNIVERSITY OF CHINA, Taiyuan City (CN); SHANXI ZHONGBEI NEW MATERIAL TECHNOLOGY CO., LTD., Taiyuan City (CN)

( * ) Notice: Subject to any disclaimer, the term of this patent is extended or adjusted under 35 U.S.C. 154(b) by 865 days.

(21) Appl. No.: 17/830,656

(22) Filed: Jun. 2, 2022

(65) Prior Publication Data

US 2022/0289934 A1 Sep. 15, 2022

(30) Foreign Application Priority Data

Jan. 22, 2022 (CN) ........................ 202210075240.2

(51) Int. Cl.
*C08K 3/04* (2006.01)
*C08J 3/22* (2006.01)

(52) U.S. Cl.
CPC ................. *C08K 3/042* (2017.05); *C08J 3/22* (2013.01); *C08J 2307/02* (2013.01)

(58) Field of Classification Search
CPC . C08K 3/042; C08K 3/04; C08K 3/06; C08K 3/22; C08K 9/04; C08J 3/22; C08J 3/02; C08J 2307/02; B60C 2200/06; B60C 1/00; B60C 1/0016; B60C 1/0025; C08L 2310/00; C08L 7/00
See application file for complete search history.

(56) References Cited

U.S. PATENT DOCUMENTS

2014/0323610 A1* 10/2014 Liu ............................ C08J 3/22 524/424
2015/0302948 A1* 10/2015 Hong ...................... H01F 1/447 252/503

FOREIGN PATENT DOCUMENTS

CN 102604175 A 7/2012
CN 104693546 A * 6/2015 ............. C08K 13/06
CN 105037830 A 11/2015
CN 105968444 A * 9/2016 ................ C08L 7/00
CN 110358156 A * 10/2019 ........... B60C 1/0016
WO WO-2018166477 A1 * 9/2018 ............ D06M 11/74
WO WO-2021247153 A2 * 12/2021 ............... B60C 1/00

OTHER PUBLICATIONS

CN-104693546-A translation (Liu et al., Preparation method of high-performance graphene oxide/solution polymerized styrene-butadiene rubber composite material; Year 2017) (Year: 2017).*
CN-110358156-A translation (Luan et al., A kind of tire tread glue and preparation method thereof; Year: 2022) (Year: 2022).*
Chembk, Silane Coupling Agent KH-550 (Year: 2025).*
Special Chem, Rubber Accelerator TMTD (TT) Powder (Year: 2025).*
CN105968444 (A) translation (Zhou et al., Coating rubber material for toughened printing rubber rolls and preparation method of coating rubber material, Year: 2016 ) (Year: 2016).*
WO2018166477A1 translation; Zhang et al., Modified fibre product, preparation method therefor and use thereof (Year: 2018).*

* cited by examiner

*Primary Examiner* — Arrie L Reuther
*Assistant Examiner* — Doris Ling

(57) ABSTRACT

A method for preparing a graphene masterbatch by an aqueous phase synergistic aggregating precipitating process and a method for molding a long-lifespan tire for a loading wheel of a heavy-duty vehicle. In this application, a graphene oxide aqueous dispersion and natural rubber latex are taken as raw materials, and subjected to co-precipitating in a water medium to prepare a high-graphene content masterbatch with individual components evenly dispersed. The graphene masterbatch is further subjected to two-stage high-temperature mechanical blending with a natural rubber block to achieve the uniform dispersion of graphene in a rubber composites.

8 Claims, No Drawings

METHOD FOR PREPARING GRAPHENE MASTERBATCH BY AQUEOUS PHASE SYNERGISTIC AGGREGATING PRECIPITATING PROCESS AND METHOD FOR MOLDING LONG-LIFESPAN TIRE FOR LOADING WHEEL OF HEAVY-DUTY VEHICLE

CROSS-REFERENCE TO RELATED APPLICATIONS

This application claims the benefit of priority from Chinese Patent Application No. 202210075240.2, filed on Jan. 22, 2022. The content of the aforementioned application, including any intervening amendments thereto, is incorporated herein by reference in its entirety.

TECHNICAL FIELD

This application relates to functional rubber composites, and more particularly to a method for preparing a graphene masterbatch by an aqueous phase synergistic aggregating precipitating process and a method for molding a long-lifespan tire for a loading wheel of a heavy-duty vehicle.

BACKGROUND

Rubber has currently played a critical role in supporting and promoting social development and developing national economy and national defense industry. In order to adapt to the development tendency of modern tires towards high speed, excellent strength, low energy consumption and multi-function, the corresponding rubber materials are required to have enhanced performance and diversified function. As a rubber filler, graphene is highly anticipated in both industrial production and scientific research. At present, the application of new functional carbon materials in rubber to prepare composites with special properties has received extensive attention from researchers.

The dynamic heat build-up of rubber composites depends on their own viscoelasticity. In the vulcanized rubber product, the three-dimensional crosslinked network structure formed by the rubber macromolecular chain will constrain the movement of rubber and the filler particles. Therefore, the relative position between the rubber macromolecular chain and the filler particle is fixed in the static state. Nevertheless, when subjected to dynamic stress, the rubber material will experience significant macroscopic deformation, and from a microscopic point of view, the relative motion will occur between the macromolecular chains of the rubber and between the molecular chain of the rubber and the filler particles due to the action of external force, resulting in the occurrence of relative sliding friction between the rubber macromolecular chains, between the rubber macromolecular chain and the filler particle, and between the filler particles inside the rubber, accompanied by the heat generation (namely, the dynamic heat build-up). As a result, optimizing the dispersion of fillers in the rubber matrix and the filler-rubber interfacial interaction is crucial for the reduction of the heat build-up of the rubber tires. In addition, reducing the internal heat build-up of rubber composites is of great significance for reducing the heat accumulation inside the tire and prolonging the service life of the rubber tires.

The latex blending method is considered outstanding in the preparation of filler masterbatches, which can not only improve the dispersion of the fillers, but also facilitate the continuous mixing. Moreover, this method also has shortened mixing time, lowered energy consumption and less dust pollution. Unfortunately, the graphene oxide is greatly different from the latex in specific gravity, and graphene oxide sheets will be stacked due to π-π adsorption. In conclusion, it is difficult to obtain a high-graphene content masterbatch with individual components uniformly dispersed by the conventional latex blending method.

SUMMARY

An objective of this application is to provide a method for preparing a high-graphene content masterbatch with individual components uniformly dispersed by an aqueous phase synergistic aggregating precipitating process, which is then mechanically blended with a natural rubber block to prepare a rubber compound. This method can mitigate the pollution and energy consumption, shorten the processing time, so as to lower the rubber processing cost and improve the processing flexibility. Moreover, the method provided herein has an environmentally-friendly process, and can significantly improve the performance of natural rubber products.

The technical solutions of this application are described as follows.

In a first aspect, this application provides a method for preparing a graphene masterbatch by an aqueous phase synergistic aggregating precipitating process, comprising:

(S1) mixing an anionic surfactant with deionized water, followed by an addition of graphene oxide and uniform dispersion to obtain a graphene oxide aqueous dispersion; and adjusting the graphene oxide aqueous dispersion to pH 10;

(S2) mixing a surface modifier with deionized water, followed by addition of the graphene oxide aqueous dispersion obtained in step (S1), an activator and a catalyst, and reaction to obtain a modified graphene oxide aqueous dispersion; and (S3) adding deionized water to a natural rubber latex, and then adding the modified graphene oxide aqueous dispersion prepared in step (S2), followed by mixing to obtain a mixed emulsion, wherein the modified graphene oxide particles and rubber particles in natural rubber latex form bound particles due to an electrostatic attraction of positive ions on a protein-phospholipid film on a surface of the rubber particles in natural rubber latex to keep stable; adding a flocculant to the mixed emulsion, wherein flocculation occurs due to a reduction of repulsion between negative charges of the rubber particles in natural rubber latex that keeps the natural rubber latex stable; rubber particles in natural rubber latex whose protection layers are damaged and the modified graphene particles further undergo mutual adsorption due to π-π interaction, such that the bound particles and the rubber particles in natural rubber latex experience an orderly aggregation in the water and co-precipitating from the water to obtain a crude rubber compound; and subjecting the crude rubber compound to water washing and drying to obtain the graphene masterbatch.

In an embodiment, the anionic surfactant is selected from the group consisting of alkylbenzene sulfonate, α-olefin sulfonate, alkane sulfonate, α-sulfo monocarboxylate, sulfo alkyl fatty acid ester, succinate sulfonate, alkyl naphthalene sulfonate, petroleum sulfonate, lignosulfonate, alkyl glyceryl ether sulfonate and a mixture thereof.

DESCRIPTION

In an embodiment, the surface modifier is selected from the group consisting of L-cysteine, γ-aminopropyl trimethoxy silane, anilino-methyl-triethoxysilane, anilino-methyl-trimethoxysilane, N-β (aminoethyl)-γ-aminopropyl trimethoxysilane, N-β (aminoethyl)-γ-aminopropyl dimethoxysilane, N-β (aminoethyl)-γ-aminopropyl triethoxysilane, N-β (aminoethyl)-γ-aminopropyl diethoxysilane and a mixture thereof.

In an embodiment, the catalyst in step (S2) is N-hydroxysuccinimide, and the activator is 1-(3-Dimethylaminopropyl)-3-ethylcarbodiimide hydrochloride.

In an embodiment, the graphene masterbatch comprises 1-20% by weight of the graphene oxide.

In an embodiment, the flocculant is selected from the group consisting of calcium chloride solution, sodium chloride solution, potassium chloride solution, sodium sulfate solution, hydrochloride solution, formic acid solution and a combination thereof.

In an embodiment, in step (S3), the deionized water is added, such that a content of the natural rubber latex is 10-40 wt.%.

In a second aspect, this application provides a method for molding a long-lifespan tire for a loading wheel of a heavy-duty vehicle, comprising:

subjecting the graphene masterbatch prepared by the method mentioned above and a natural rubber block to plastication in an internal mixer, and then adding a vulcanization accelerator, an anti-aging agent, an antioxidant, zinc oxide and carbon black in sequence followed by uniform mixing to produce a rubber mixture followed by discharging, wherein the vulcanization accelerator is N-(oxydiethylene)-2-benzothiazole sulfenamide (NOBS), the anti-aging agent is N-Isopropyl-N'-phenyl-1,4-phenylenediamine, the antioxidant is poly(1,2-dihydro-2,2,4-trimethylquinoline); cooling the rubber mixture to room temperature, and transferring the rubber mixture to an open mill for a milling process, where during the milling process, sulfur is introduced to the rubber mixture; after being mixed evenly, subjecting the rubber mixture to a mill run until the rubber mixture is free of bubbles and then standing; re-milling the rubber mixture on the open mill to make a surface of the rubber mixture smooth and uniform; and transferring the rubber mixture to a tire mold followed by vulcanization to obtain the long-lifespan tire for the loading wheel of the heavy-duty vehicle.

In an embodiment, a mass ratio of the graphene masterbatch to the natural rubber block to the vulcanization accelerator to the anti-aging agent to the antioxidant to the zinc oxide to the sulfur to the carbon black is (10~100):(90~0): 2:1:1:5:2:60.

Compared with the prior art, this application has the following beneficial effects.

(1) With regard to this application, the graphene oxide aqueous dispersion and the natural rubber latex are taken as raw materials, and subjected to a synergistic aggregating precipitating process in a water medium that is efficient, concise and easy for industrialization, to prepare a high-graphene content masterbatch with individual components evenly dispersed. Further, a method for molding a long-lifespan tire for a loading wheel of a heavy-duty vehicle using the prepared graphene masterbatch as the raw material. The graphene masterbatch is subjected to two-stage high-temperature mechanical blending with the solid natural rubber block to allow the graphene to be well dispersed in the rubber composites. The aqueous phase synergistic aggregating precipitating process provided herein enables the prepared masterbatch to keep each component well dispersed as their good dispersion in the evenly mixed emulsion. In addition, the aqueous phase synergistic aggregating precipitating process is simple and environmental-friendly, and the equipment involved is common, such that the aqueous phase synergistic aggregating precipitating process is easy to be implemented and convenient to be industrialized.

(2) In this application, the graphene filler-rubber matrix interfacial interaction is strong, such that the mechanical properties of rubber are improved, which mitigates the temperature rise caused by compression fatigue during the dynamic use process, thereby slowing down the heat aging of rubber tires during the dynamic operation, prolonging the service life of rubber tires.

(3) Compared with conventional tire productions, this application uses the high-concentration nanofiller masterbatch to prepare rubber products, which can not only ensure the mechanical properties, but also significantly lower the cost of human labor, raw materials and transportation, thereby enormously lowering production costs. Moreover, dust pollution caused by rubber mixing can be avoided, such that the method is more environmental-friendly.

DETAILED DESCRIPTION OF EMBODIMENTS

The technical solutions of this application will be described clearly and completely below with reference to the embodiments. Obviously, described below are merely some embodiments of this application, which are not intended to limit this application. Based on the embodiments provided herein, other embodiments made by those skilled in the art without paying creative efforts should still fall within the scope of the present application defined by the appended claims.

This application provides a method for preparing a graphene masterbatch by an aqueous phase synergistic aggregating precipitating process, which is performed as follows.

(S1) Preparation of a Graphene Oxide Aqueous Dispersion

An anionic surfactant is fully mixed with deionized water, to which graphene oxide is added and uniformly dispersed to obtain a graphene oxide aqueous dispersion. The graphene oxide aqueous dispersion is adjusted to pH 10.

(S2) Preparation of Modified Graphene Oxide Aqueous Dispersion A surface modifier is fully mixed with deionized water, to which the graphene oxide aqueous dispersion prepared in step (S1), an activator and a catalyst are added. The mixture is reacted for 6-48 h to obtain a modified graphene oxide aqueous dispersion.

(S3) Preparation of Graphene Masterbatch by an Aqueous Phase Synergistic Aggregating Precipitating Process Deionized water is added to a natural rubber latex, to which the modified graphene oxide aqueous dispersion prepared in step (S2) is added, and fully mixed to obtain a mixed emulsion. Modified graphene oxide particles and rubber particles in natural rubber latex will form bound particles due to an electrostatic attraction of positive ions on a protein-phospholipid film on the surface of the rubber particles in natural rubber latex, which remain stable. A flocculant is added to the mixed emulsion. Flocculation occurs due to the reduction of repulsion between negative charges of particles that keeps the rubber emulsion stable. Rubber particles in natural rubber latex with protection layers damaged and the modified graphene particles will further undergo mutual adsorption due to $\pi$-$\pi$ interaction, such that the bound particles and the rubber particles in natural rubber latex will experience an orderly aggregation in the water phase and co-precipitating from the water to obtain a crude rubber compound, which is subjected to water washing and drying to obtain the graphene masterbatch.

In this embodiment, an anionic surfactant is employed to perform surface activation and modification on graphene components to reduce the stacking of graphene sheets, so as to obtain the graphene oxide dispersion. Then a surface modifier is adopted to perform secondary modification on the graphene oxide, so as to form interaction with the natural rubber molecular chains to form stable bound particles. In the presence of the flocculant, the bound particles formed by the graphene particles and the rubber particles in natural rubber latex and other free rubber particles in natural rubber latex will experience aggregation and co-precipitating in the water phase, so as to obtain the masterbatch with individual components uniformly dispersed.

In step (S1), the anionic surfactant is selected from the group consisting of alkylbenzene sulfonate, α-olefin sulfonate, alkane sulfonate, α-sulfo monocarboxylate, sulfo alkyl fatty acid ester, succinate sulfonate, alkyl naphthalene sulfonate, petroleum sulfonate, lignosulfonate, alkyl glyceryl ether sulfonate and a mixture thereof.

In this embodiment, the pH value is adjusted using ammonia water with a concentration of 10 wt. %.

In step (S2), the surface modifier is selected from the group consisting of L-cysteine, γ-aminopropyl trimethoxy silane, anilino-methyl-triethoxysilane, anilino-methyl-trimethoxysilane, N-β (aminoethyl)-γ-aminopropyl trimethoxysilane, N-β (aminoethyl)-γ-aminopropyl dimethoxysilane, N-β (aminoethyl)-γ-aminopropyl triethoxysilane, N-β (aminoethyl)-γ-aminopropyl diethoxysilane and a mixture thereof. The catalyst is N-hydroxysuccinimide, and the activator is 1-(3-Dimethylaminopropyl)-3-ethylcarbodiimide hydrochloride. The activator and the catalyst are added, followed by a reaction for 6-48 h.

In step (S3), the deionized water is added such that a content of the natural rubber latex is 10-40 wt. %.

In step (S3), the flocculant is selected from the group consisting of calcium chloride solution, sodium chloride solution, potassium chloride solution, sodium sulfate solution, hydrochloride solution, formic acid solution and a combination thereof.

In this embodiment, the graphene masterbatch comprises 1-20% by weight of the graphene oxide.

This application provides a method for molding a long-lifespan tire for a loading wheel of a heavy-duty vehicle, which is performed as follows.

The graphene masterbatch prepared by the above-mentioned method and a natural rubber block are subjected to plastication in an internal mixer. A vulcanization accelerator, an anti-aging agent, an antioxidant, zinc oxide and carbon black are added in sequence followed by uniform mixing to produce a rubber mixture followed by discharging, where the vulcanization accelerator is N-(oxydiethylene)-2-benzothiazole sulfenamide (NOBS), the anti-aging agent is N-Isopropyl-N'-phenyl-1,4-phenylenediamine and the antioxidant is poly(1,2-dihydro-2,2,4-trimethylquinoline). The rubber mixture is cooled to room temperature, and then the rubber mixture is transferred to an open mill for milling, where during the milling, sulfur is introduced to the rubber mixture. After being mixed evenly, the rubber mixture is subjected to a mill run until the rubber mixture is free of bubbles, followed by standing. The rubber mixture is re-milled on the open mill to make the surface of the rubber mixture smooth and uniform. The rubber mixture is transferred to a tire mold, followed by vulcanization to obtain the long-lifespan tire for the loading wheel of the heavy-duty vehicle.

In this embodiment, a mass ratio of the graphene masterbatch to the natural rubber block to the vulcanization accelerator to the anti-aging agent to the antioxidant to the zinc oxide to the sulfur to the carbon black is (10~100):(90~0):2:1:1:5:2:60.

In addition, the graphene masterbatch and the natural rubber block are subjected to plastication on the internal mixer for 3-5 min. A vulcanization accelerator, an anti-aging agent, an antioxidant, zinc oxide and carbon black are added at 105-120° C. and 30-50 rpm for 5-10 min. The standing is performed for 18-36 h. The vulcanization is performed at 135-170° C. and 10-30 MPa for 10-25 min.

The technical solutions of this application will be described in detail below with reference to the following embodiments.

EXAMPLE 1

(S1) Preparation of Graphene Oxide Aqueous Dispersion 1 g of alkylbenzene sulfonate, as the anionic surfactant, was added to 25 mL of water, and stirred for 10 min. 0.5 g of graphene oxide powder was added and dispersed for 30 min to obtain a uniform graphene oxide aqueous dispersion, which was then adjusted to pH 10 with 10 wt. % ammonia water, to obtain the aqueous dispersion with the required graphene oxide concentration.

(S2) Preparation of Modified Graphene Oxide Aqueous Dispersion 1 g of L-cysteine, as the surface modifier, was added to 25 mL of hot water to obtain a L-cysteine solution. After cooling to room temperature, the L-cysteine solution was added with the graphene oxide aqueous dispersion, stirred, and added with 0.01 g of 1-(3-Dimethylaminopropyl)-3-ethylcarbodiimide hydrochloride (as the activator) and 0.01 g of N-hydroxysuccinimide (as the catalyst) and reacted under stirring for 8 h to obtain a well-dispersed modified graphene oxide aqueous dispersion.

(S3) Preparation of Graphene Masterbatch by the Aqueous Phase Synergistic Aggregating Precipitating Process A natural rubber latex was added with deionized water and mixed evenly to obtain 250 g of a 20 wt. % natural rubber latex emulsion. Then, the modified graphene oxide aqueous dispersion was added and fully mixed to obtain a mixed emulsion. Modified graphene oxide particles and rubber particles in natural rubber latex will form bound particles due to an electrostatic attraction of positive ions on a protein-phospholipid film on the surface of the rubber particles in natural rubber latex and remain stable. The mixed emulsion was added with 20 g of 10 wt.% calcium chloride solution, and flocculation occurred due to the reduction of repulsion between negative charges of particles that kept the rubber emulsion stable. Rubber particles in natural rubber latex with damaged protection layers and the modified graphene particles will further undergo mutual adsorption due to π-π interaction, such that the bound particles and other free rubber particles in natural rubber latex will aggregate in the water phase in an orderly manner and co-precipitating to obtain a crude rubber compound. The crude rubber compound was washed with water and dried in an oven at 65° C. to obtain a graphene masterbatch.

(S4) Tire Molding

The graphene masterbatch (50.5 g) prepared in step (S3) and a natural rubber block (50 g) were plasticated in an internal mixer for 5 min at 120° C. and 50 rpm, and then 2 g of N-(oxydiethylene)-2-benzothiazole sulfenamide (NOBS, as the vulcanization accelerator), 1 g of N-Isopropyl-N'-phenyl-1,4-phenylenediamine (as the anti-aging agent), 1 g of poly(1,2-dihydro-2,2,4-trimethylquinoline) (RD, as the antioxidant), 5 g of zinc oxide and 60 g of carbon black N330 were added in sequence at 110° C. and 40 rpm, and mixed for 15 min to obtain a rubber mixture. After cooling to room temperature, the rubber mixture was transferred to an open mill for milling, where during the milling process, 2 g of sulfur was added and mixed evenly until there were no bubbles in the rubber mixture. The rubber mixture was subjected to standing at room temperature for 24 h, re-milled on the open mill to make the surface smooth and uniform and cut into rubber sheets with a thickness of about 5 mm and a width of about 160 mm, which were then subjected to vulcanization in a vulcanization mold at 153° C. and 15 MPa for 25 min to produce a tire sample.

EXAMPLE 2

Example 2 was basically the same as the Example 1, except that in step (S3), the mass of 20 wt.% natural rubber latex emulsion was 125 g, and in step (S4), the mass ratio of graphene masterbatch to natural rubber block was 25.5:75.

EXAMPLE 3

Example 3 was basically the same as the Example 1, except that in step (S3), the mass of 20 wt. % natural rubber latex emulsion was 83.5 g, and in step (S4), the mass ratio of graphene masterbatch to natural rubber block was 17.2: 83.3.

EXAMPLE 4

Example 4 was basically the same as the Example 1, except that in step (S3), the mass of 20 wt.% natural rubber latex emulsion was 62.5 g, and in step (S4), the mass ratio of graphene masterbatch to natural rubber block was 13:87.5.

The formula of individual embodiments is shown in Table 1.

COMPARATIVE EXAMPLE 1

(S1) Preparation of Graphene Oxide Dispersion 50 mL of deionized water was added to 0.5 g of a graphene oxide powder to obtain a well-dispersed uniform graphene oxide aqueous dispersion, which was then adjusted to pH 10 with 10 wt.% ammonia water, to obtain the aqueous dispersion with the required graphene oxide concentration of 1 wt.%.

(S2) Preparation of Natural Rubber Latex Emulsion

A certain amount of deionized water was added to 166.7 g of natural rubber latex, followed by stirring and uniform dispersion to obtain a 20 wt.% latex solution.

(S3) Preparation of Graphene Oxide Modified Natural Rubber Compound 50 g of graphene oxide aqueous dispersion prepared in step (Si) and 500 g of natural rubber latex emulsion prepared in step (S2) were mixed to obtain a well-dispersed emulsion. 40 g of 10 wt. % calcium chloride solution for flocculation. Then, the crude rubber was obtained. The obtained crude rubber was subjected to water washing and drying to a constant weight in an oven at 65° C. to obtain a graphene oxide modified natural rubber compound.

(S4) A graphene oxide modified natural rubber compound prepared in step (S3) was subjected to plastication in an internal mixer for 5 min at 120° C. and 50 rpm, and then 2 g of N-(oxydiethylene)-2-benzothiazole sulfenamide (NOBS, as the vulcanization accelerator), 1 g of N-Isopropyl-N'-phenyl-1,4-phenylenediamine (as the anti-aging agent), 1 g of poly(1,2-dihydro-2,2,4-trimethylquinoline) (RD, as the antioxidant) 5 g of zinc oxide and 60 g of carbon black N330 were added in sequence at 110° C. and 40 rpm, and mixed for 15 min to obtain a rubber mixture. After cooling to room temperature, the rubber mixture was transferred to an open mill for milling, where during the milling process, 2 g of sulfur was added and mixed evenly until there were no bubbles in the rubber material. The rubber mixture was subjected to standing at room temperature for 24 h, re-milled on the open mill to make the surface smooth and uniform, and cut into rubber sheets with a thickness of about 5 mm and a width of about 160 mm, which were then subjected to vulcanization in a vulcanization mold at 153° C. and 15 MPa for 25 min to produce a tire sample.

The formula in each Example and the Comparative Example is shown in Table 1. The mechanical properties were tested according to ISO 37-2005 under a tensile rate of 500 mm/min. The results are shown in Table 2.

TABLE 1

Formula of Examples 1-4 and the Comparative Example

| Sample | Comparative Example | Example 1 | Example 2 | Example 3 | Example 4 |
|---|---|---|---|---|---|
| Graphene content in rubber/g | 0.5 | 0.5 | 0.5 | 0.5 | 0.5 |
| Graphene masterbatch/g | 100.5 | 50.5 | 25.5 | 17.2 | 13 |
| Natural rubber block/g | 0 | 50 | 75 | 83.3 | 87.5 |
| Carbon black/g | 60 | 60 | 60 | 60 | 60 |
| Alkylbenzene sulfonate/g | — | 1 | 1 | 1 | 1 |
| L-cysteine/g | — | 1 | 1 | 1 | 1 |
| Zinc oxide/g | 5 | 5 | 5 | 5 | 5 |
| N-Isopropyl-N'-phenyl-1,4-phenylene diamine/g | 1 | 1 | 1 | 1 | 1 |
| NOBS/g | 2 | 2 | 2 | 2 | 2 |
| poly(1,2-dihydro-2,2,4-trimethyl quinoline)/g | 1 | 1 | 1 | 1 | 1 |
| Sulfur/g | 2 | 2 | 2 | 2 | 2 |

TABLE 2

| Performance of rubber composites | | | | | | |
| --- | --- | --- | --- | --- | --- | --- |
| Item | Tensile strength/ MPa | Breaking elongation/ % | Strength at 100% elongation/ MPa | Tearing strength N/mm | Hardness/ HA | Heat build-up/ ° C. |
| Comparative Example | 24.2 | 460.4 | 5.67 | 49.55 | 71.5 | 27.6 |
| Example 1 | 24.4 | 476.3 | 5.73 | 53.33 | 70.5 | 23.7 |
| Example 2 | 25.8 | 468.8 | 5.72 | 65.16 | 70.0 | 22.0 |
| Example 3 | 25.7 | 430.2 | 5.68 | 58.93 | 71.5 | 25.5 |
| Example 4 | 23.7 | 410.4 | 5.88 | 60.20 | 73.0 | 26.0 |

As demonstrated in Table 2, the blending of the graphene masterbatch prepared by the aqueous phase synergistic aggregating precipitating process and the natural rubber block can not only effectively improve the mechanical properties of the graphene-modified rubber composites, but also significantly mitigate the temperature rise caused by compression fatigue.

At last, it should be noted that described above are merely illustrative of the technical solutions of this application, and are not intended to limit the present application. Although this application has been described in detail with reference to the above-mentioned examples, it should be understood by those skilled in the art that various modifications and equivalent replacements can be made to the technical solutions described above. Those modifications and replacements made without departing from the spirit of the application should still fall within the scope of the present application defined by the appended claims.

What is claimed is:

1. A method for preparing a graphene masterbatch by an aqueous phase synergistic aggregating precipitating process, comprising:

(S1) mixing an anionic surfactant with deionized water, followed by an addition of graphene oxide and uniform dispersion, such that the anionic surfactant is employed to perform surface activation and modification on graphene components to reduce stacking of graphene sheets, so as to obtain a graphene oxide aqueous dispersion; and adjusting the graphene oxide aqueous dispersion to pH 10;

(S2) mixing a surface modifier with deionized water, followed by an addition of the graphene oxide aqueous dispersion obtained in step (S1), an activator and a catalyst, and reaction to obtain a modified graphene oxide aqueous dispersion, wherein the surface modifier is L-cysteine and is adopted to perform secondary modification on the graphene oxide; and (S3) adding deionized water to a natural rubber latex, and then adding the modified graphene oxide aqueous dispersion prepared in step (S2), followed by mixing to obtain a mixed emulsion, wherein modified graphene oxide particles and rubber particles in natural rubber latex form bound particles due to an electrostatic attraction of positive ions on a protein-phospholipid film on a surface of the rubber particles in natural rubber latex to keep stable; adding a flocculant to the mixed emulsion, wherein flocculation occurs due to a reduction of repulsion between negative charges of the rubber particles in natural rubber latex that keeps the natural rubber latex stable; rubber particles in natural rubber latex whose protection layers are damaged and the modified graphene particles further undergo mutual adsorption due to π-π interaction, such that the bound particles and the rubber particles in natural rubber latex experience an orderly aggregation in the water and co-precipitating from the water to obtain a crude rubber compound; and subjecting the crude rubber compound to water washing and drying to obtain a graphene masterbatch.

2. The method of claim 1, wherein the anionic surfactant is selected from the group consisting of alkylbenzene sulfonate, α-olefin sulfonate, alkane sulfonate, α-sulfo monocarboxylate, sulfo alkyl fatty acid ester, succinate sulfonate, alkyl naphthalene sulfonate, petroleum sulfonate, lignosulfonate, alkyl glyceryl ether sulfonate and a mixture thereof.

3. The method of claim 1, wherein in step (S2), the catalyst is N-hydroxysuccinimide, the activator is and 1-(3-Dimethylaminopropyl)-3-ethylcarbodiimide hydrochloride.

4. The method of claim 1, wherein the graphene masterbatch comprises 1-20% by weight of the graphene oxide.

5. The method of claim 1, wherein the flocculant is selected from the group consisting of calcium chloride solution, sodium chloride solution, potassium chloride solution, sodium sulfate solution, hydrochloride solution, formic acid solution and a combination thereof.

6. The method of claim 1, wherein in step (S3), the deionized water is added such that a content of the natural rubber latex is 10-40 wt. %.

7. A method for molding a tire for a loading wheel of a vehicle, comprising:

(S1) mixing an anionic surfactant with deionized water, followed by an addition of graphene oxide and uniform dispersion, such that the anionic surfactant is employed to perform surface activation and modification on graphene components to reduce stacking of graphene sheets, so as to obtain a graphene oxide aqueous dispersion; and adjusting the graphene oxide aqueous dispersion to pH 10;

(S2) mixing a surface modifier with deionized water, followed by an addition of the graphene oxide aqueous dispersion obtained in step (S1), an activator and a catalyst, and reaction to obtain a modified graphene oxide aqueous dispersion, wherein the surface modifier is L-cysteine and is adopted to perform secondary modification on the graphene oxide; and (S3) adding deionized water to a natural rubber latex, and then adding the modified graphene oxide aqueous dispersion prepared in step (S2), followed by mixing to obtain a mixed emulsion, wherein modified graphene oxide particles and rubber particles in natural rubber latex form bound particles due to an electrostatic attraction of positive ions on a protein-phospholipid film on a surface of the rubber particles in natural rubber latex to keep stable; adding a flocculant to the mixed emulsion, wherein flocculation occurs due to a reduction of repulsion between negative charges of the rubber particles in natural rubber latex that keeps the natural rubber latex stable; rubber particles in natural rubber latex whose protection layers are damaged and the modified graphene particles further undergo mutual adsorption due to π-π interaction, such that the bound particles and the rubber particles in natural rubber latex experience an orderly aggregation in the water and co-precipitating from the water to obtain a crude rubber compound; and subjecting the crude rubber compound to water washing and drying to obtain a graphene masterbatch;

(S4) subjecting the graphene masterbatch and a natural rubber block to plastication in an internal mixer, and then adding a vulcanization accelerator, an anti-aging agent, an antioxidant, zinc oxide and carbon black in sequence followed by uniform mixing to produce a rubber mixture followed by discharging, wherein the vulcanization accelerator is N-(oxydiethylene)-2-benzothiazole sulfenamide (NOBS), the anti-aging agent is N-Isopropyl-N'-phenyl-1,4-phenylenediamine, and the antioxidant is poly(1,2-dihydro-2,2,4-trimethylquinoline); cooling the rubber mixture to room temperature, and transferring the rubber mixture to an open mill for a milling process, where during the milling process, sulfur is introduced to the rubber mixture;

after being mixed evenly, subjecting the rubber mixture to a mill run until the rubber mixture is free of bubbles and then standing; re-milling the rubber mixture on the open mill to make a surface of the rubber mixture smooth and uniform; and transferring the rubber mixture to a tire mold followed by vulcanization to obtain the tire for the loading wheel of the vehicle.

8. The method of claim 7, wherein a mass ratio of the graphene masterbatch to the natural rubber block to the vulcanization accelerator to the anti-aging agent to the antioxidant to the zinc oxide to the sulfur to the carbon black is (10-100):(50-87.5):2:1:1:5:2:60.

* * * * *